J. A. GRAY.
SPRING AND PNEUMATIC WHEEL.
APPLICATION FILED JULY 7, 1910.

1,080,106.

Patented Dec. 2, 1913.
3 SHEETS—SHEET 1.

Witnesses:
Horace M. Gray
C. Louis Gray

Inventor:
Joseph A. Gray

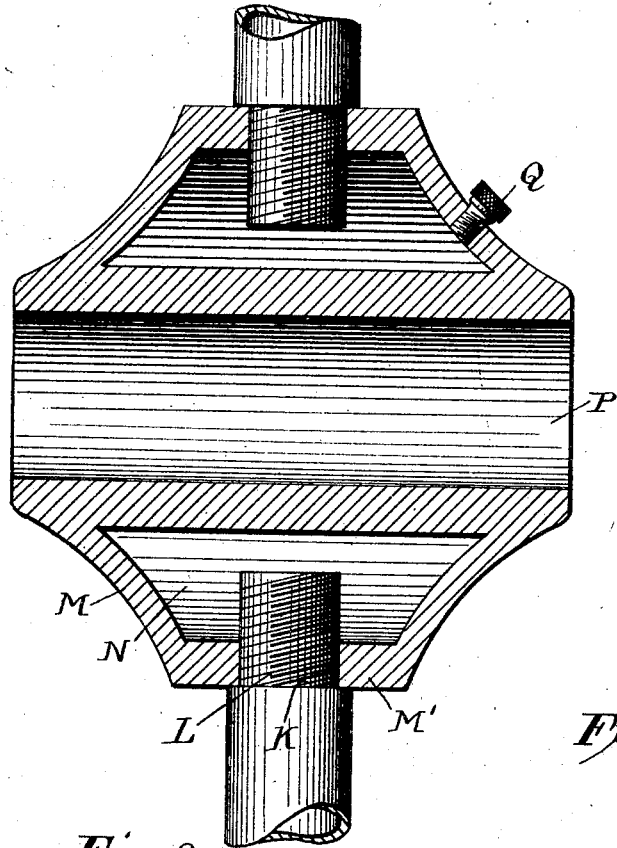
Fig. 2.
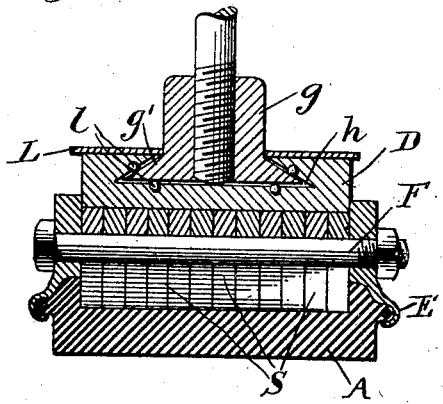
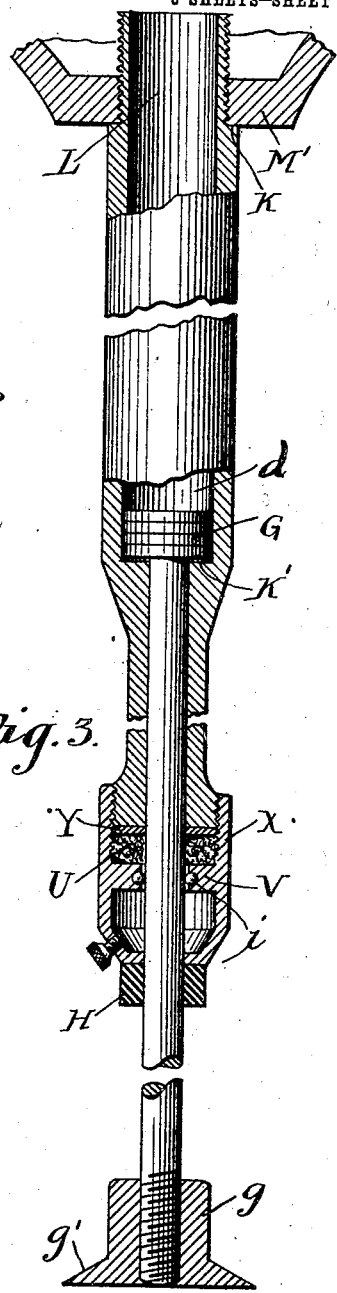
Fig. 3.

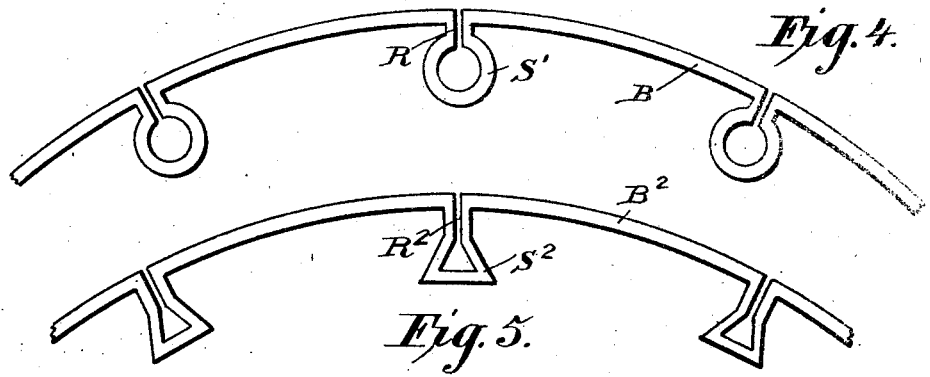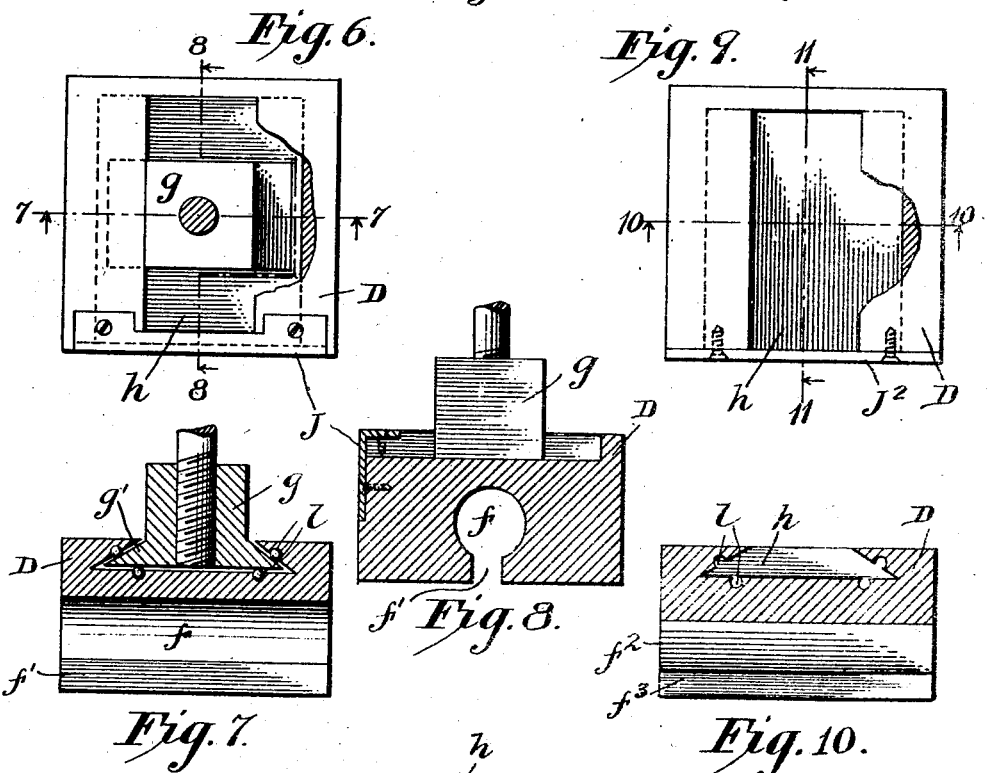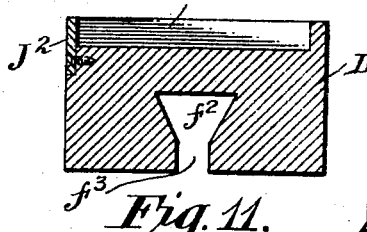

UNITED STATES PATENT OFFICE.

JOSEPH A. GRAY, OF NORWALK, CONNECTICUT.

SPRING AND PNEUMATIC WHEEL.

1,080,106.

Specification of Letters Patent.

Patented Dec. 2, 1913.

Application filed July 7, 1910. Serial No. 570,907.

*To all whom it may concern:*

Be it known that I, JOSEPH A. GRAY, a citizen of the United States, residing at 3 Morgan avenue, Norwalk, in the county of Fairfield, in the State of Connecticut, have invented a new and useful Spring and Pneumatic Wheel, of which the following is a specification.

My invention relates to wheels for vehicles and other devices of similar nature. Its principal object is to provide a resilient wheel that will possess all necessary durable qualities and be free from faults of others.

Another object is to provide a rim which will be freely movable radially and circumferentially, and in which one portion of the rim will flex without disturbing other adjacent parts.

Another object is a wheel that may be constructed inexpensively and may be maintained in order without considerable expense. I accomplish this by piston rod and members, cylinder and rod support spokes and members, a pneumatic hub and spokes and a sliding spring rim which may spring outward or inward at any point and between the spokes beyond the maximum normal limit of its circumference, increasing its ease of action, by the features substantially as hereinafter described, and as particularly pointed out in the claims.

Figure 1:
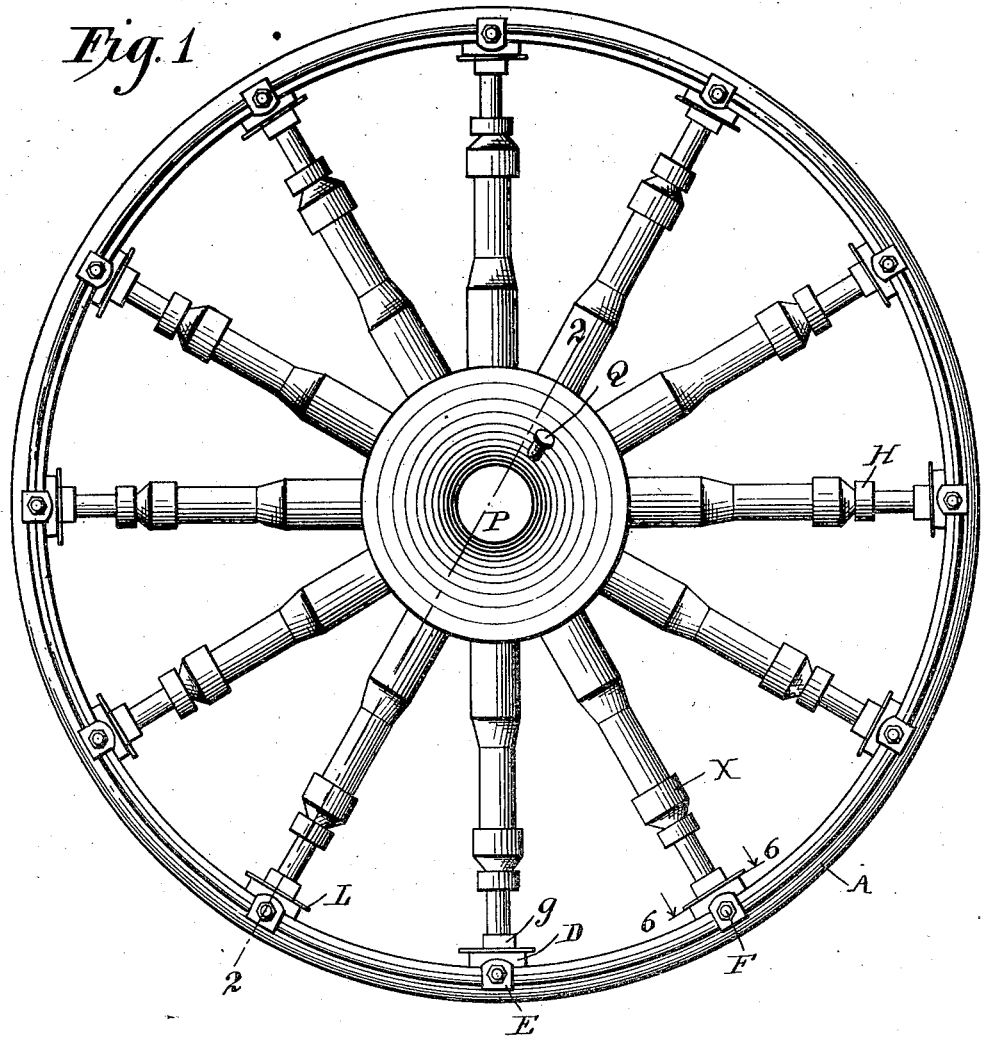
Figure 12:
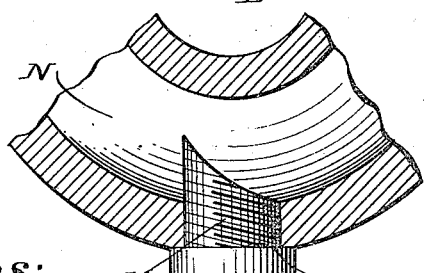

Figure 1 is a side elevation of a wheel embodying my invention. Fig. 2 is an enlarged transverse sectional view on the line 2—2 Fig. 1 of the rim and cover with fastenings, bolt, clamp, flanged nut, piston rod at point of fastening, circumferential groove, transverse slot with loops therein, the shield and ball races assembled. Fig. 3 is a vertical central section of a spoke including a view of a cylinder member, of the piston and rod with threaded end and piston rings, and cap with oil chamber in transverse section with ball race and packing chamber with movable bottom, and rubber cushion, section of the flanged nut screwed thereon, and section of the hub into which it is fastened, on an enlarged scale. Fig. 4 is a side view of a section of the rim showing a manner of looping it, on an enlarged scale. Fig. 5 is a modification of the rim section showing the loops formed by bending. Fig. 6 is a detailed sectional view on the line 6—6 Fig. 1 looking in the direction of the arrows. Fig. 7 is a transverse sectional view of the clamp and flanged nut assembled on the line of 7—7 Fig. 6. Fig. 8 is a circumferential sectional view of a clamp on the line of 8—8 Fig. 6. Fig. 9 is a detailed view of a modified form of the clamp. Fig. 10 is a lateral sectional view of the clamp shown in Fig. 9, taken on the line 10—10 Fig. 9. Fig. 11 is a circumferential sectional view of a modified form of the clamp, on the line 11—11 Fig. 9. Fig. 12 is a detail section of the hub showing a modified form of the spoke.

Referring to the drawings, similar letters refer to similar parts throughout.

P represents the spindle of the hub to fit the axle. The hub is formed with an inclined wall M, inclosing the annular chamber N, the walls M being connected by the annular flanges M', provided with openings into which the cylinder members L, are secured. The inner extremities of these cylinder members are open and extend into the chamber N. The ends may be inclined more easily to permit the entrance of lubricant into the cylinders if desired, see Fig. 12. The chambered hub is adapted to be supplied with oil through the valve Q, which valve may also be used for the introduction of compressed air into the hub chamber N, and the chambers of the several spoke members. The several spoke members fill with lubricant from the hub, lubricating them and preventing the escape of the lighter fluid, with which the hub may be filled in whole or in part, through the working of the pistons.

The rim of the wheel is preferably formed of a plurality of flexible spring hoops S, which are arranged side by side to form a resilient rim capable of radial movement at one side of the rim without disturbing the other side. In other words the several resilient hoops are capable of independent flexure to allow the wheel to easily pass over obstacles of less width than the width of the wheel rim. These spring hoops are preferably looped at intervals around the entire inner circumference, to allow the piston members of the spokes to be readily connected to the rim. The several loops of the different rim sections are arranged in transverse alinement when the wheel is assembled and are secured together by means of the bolt F, which also secures the clamping members E, which secure the tread member A, in position on the outer periphery of the rim sections. The tread may be formed of rubber or other suitable material.

The cylinder of the spoke is hollow and formed with a screw threaded end, which is fastened into an opening into the hub, a shoulder K, being provided at the outer extremity of the screw threads to further prevent any relative movement between the cylinder member and the hub. The inner portion of the cylinder member is hollowed out to form the chamber $d'$ in which the piston G, is adapted to reciprocate, a shoulder K', being formed at the outer extremity of the chamber $d'$, to limit the movement of the piston G. The outer end of the cylinder member is bored to provide a passage through which the piston rod of the piston G, is guided. The outer end of the cylinder member is externally threaded for the reception of the hollow cap X, which is formed with screw threads at its inner end and an interior circumferential flange V, about midway along its walls. Suitable packing materials may be inserted between this interior flange of the cap and the outer end of the cylinder member, such as for instance the washer Y, and the packing U. By adjusting the cap upon the threaded end of the cylinder the packing material is compressed or loosened as desired. A ball race may be formed in the internal flange V, for the reception of ball bearings $i$ to allow the piston rod to reciprocate more freely. A suitable valve may be provided in the outer portion of the cap X, for the introduction of oil or other lubricant, to assist in preventing the entrance of dust or grit and to lubricate the cylinder.

The piston member of the spoke is formed with the piston rod which is threaded at its outer extremity to receive the flanged nut $g$, and to which suitable piston rings are secured adjacent the inner end of the piston rod to fit snugly within the cylinder chamber $d'$. The nut $g$, is preferably formed substantially square in cross section and is formed with two outwardly extending inclined flanges or flares $g'$, at the opposite sides of the nut as shown in Fig. 3, these flanges $g'$, extending into the slot $h$, which is substantially of dovetail shape, and preferably suitable ball races are formed in the walls of the slot $h$, to receive ball bearings $l$, (see Fig. 2). The dovetailed slot $h$, is cut into the innnermost side of the clamp D, the slot being open at the ends so that the flanged nut may be easily inserted therein, a closure plate J, being adapted to close this open end of the slot after the nut $g$, is inserted. The outer extremities of the clamp D, is formed with a transverse slot $f$, of substantially the same shape and but slightly larger in diameter than the loops S, of the several rim sections B.

In the modifications shown in Figs. 4 and 8, there is a neck portion R, connecting the loops S with the peripheral portions of the rim sections, and the slot $f$, is also formed with a reduced portion $f'$, corresponding with the neck portion R.

In the modification shown in Figs. 5 and 11, the loops S, are omitted and the triangular shaped portion $S^2$ is substituted therefor, a neck portion $R^2$ connecting the triangular portion $S^2$ with the peripheral portion of the rim section $B^2$. The transverse slots $f^2$ are formed with the triangular portions and the neck portions $f^3$ to correspond with the shape of the triangular and neck portions $S^2$ and $R^2$ respectively.

A closure plate $J^2$, (Fig. 11), may be utilized instead of a closure plate J, if desired.

In assembling the wheel the threaded inner-ends of the cylinder members are secured rigidly within the openings within the hub, the pistons being first inserted within the cylinder members of the spokes. The cap X, and the packing material if desired is then put on over the piston rod and threaded onto the threaded outer end of the cylinder member. Oil is then introduced, if desired, into the cap member and into the hub member through their respective valves. The flanged nut $g$, is then threaded upon the piston rods and the flanged portions inserted into the slots $h$, of the clamp D. The loops S are then inserted within the transverse slots $f$ of the clamp D, the several loops S being arranged side by side as shown in Fig. 2. The tread A is positioned upon the rim sections B and suitable clamping members E are secured on opposite sides of the tread, being held in position by the transverse bolt F, which passes through the alined loops of the rim sections. Compressed air is then forced into the hub N, with a spray of lubricant, and into the several communicating cylinder chambers $d'$, forcing the pistons G tightly against the shoulder K' and lubricating the same and hermetically sealing them. In operation, each of the pistons is adapted to telescope within its cylinder members to compress the contents within its chamber $d'$ and hub chamber N to resist any downward movement of the axle or upward movement of the rim when an obstruction or rough place in the road is encountered. The resiliency of the rim sections will also resist the transmission of shock from the tread to the axle. It will also be apparent that if a stone or other obstruction of less width than the width of the tread is encountered some of the rim sections may move inward while the remaining sections are undisturbed. The easy revolving movement of the interior of the wheel, while the rim may remain stationary or move in the opposite direction, will ease the wheel over obstructions and rough places.

The rubber cushion H may be secured over the piston rod between the cap X and the nut $g$ to prevent the crushing together of the cap and flanged nut under an excessive load, and to provide an additional cushioning member, and an additional means of keeping the inner chamber of the cylinder clear from dust and grit. A shield of suitable shape and size L may be mounted upon the square nut $g$ to prevent the entrance of dirt, water or harmful elements into the dovetailed slot $h$, the shield being so designed as to always close the slot $h$ regardless of the movements of the nut $g$ in the slot $h$.

While the structure shown and described herein is the preferred construction of my improved wheel, it is to be understood that I do not limit myself to the specific details disclosed, but may vary the same within the scope of the appended claims.

What I claim is:—

1. In a wheel, a hollow hub, hollow cylinder members having communication with said hub, piston members movable in said cylinder members, a clamp member secured at the outer extremities of the piston members, said clamp members having transverse slots therein, and a resilient rim formed of annular sections provided with loops extending within the transverse slots of the clamp members, the hub and connecting cylinders being adapted to contain air under pressure.

2. In a wheel, a hollow hub, hollow cylinders communicating therewith and provided with slanting inner ends, the hub and cylinders adapted to contain lubricant and pneumatic fluid under pressure, pistons operable in said cylinders, piston rods carried by said pistons and provided with threaded outer ends, flanged nuts threaded onto the ends of the piston-rods, a resilient rim composed of annular sections having inwardly extending projections, clamp members provided with transverse slots into which the projections on the rim extend, and also provided with circumferential grooves for the reception of the flanged nuts, whereby the adjustment of the threaded ends of the piston-rods within the flanged nuts will regulate the diameter of the resilient rim.

3. In a wheel, a hollow hub, hollow cylinders communicating with the hub, the hub and cylinders being adapted to contain lubricant and pneumatic fluid under pressure, pistons operable in said cylinders, piston rods carried by said pistons and provided with threaded outer ends, a flanged nut threaded onto the ends of the piston rods, the outer ends of the cylinders being threaded and a cap threaded thereon, divided into two chambers by a central wall, one chamber being adapted to contain lubricant, and the other, packing material, the central wall being fitted with a ball race through which, the piston rods reciprocate, a resilient rim composed of annular coils having inwardly extending projections, clamp members provided with transverse slots into which the projections on the rim extend and also provided with a covered circumferential groove for the reception of the flanged nut, whereby the adjustment of the threaded ends of the piston-rods within the flanged nuts will regulate the diameter of the resilient rim.

4. A wheel, hollow hub, hollow cylinder spoke members, piston members movable in said cylinder members, reversed cup shaped heads on said piston fitted with expanding rings, a clamp member provided with a circumferential groove secured at the outer extremities of the piston members, a fastening device extending within the circumferential groove with ball races through which all or part of the interior of the wheel is movable at any time, said clamp member having a transverse slot therein, and a resilient rim formed of annular sections provided with loops extending within the transverse slots of the clamp members, and free to yield separately or in unison to any extent either circumferentially or laterally, the hub and connecting cylinders being adapted to internal lubrication and to contain fluid under pressure.

5. A wheel, a hollow hub, hollow cylinder members having connection with said hub, piston members movable in said cylinder members to the limit of the maximum circumference of said wheel, a clamp member secured to the outer extremities of said piston members, said clamp members having transverse slots therein, a resilient rim formed of annular sections provided with loops extending within the transverse slots of the clamp members, and a soft tire bound to the rim at the clamp fastenings, a compressible cushion between the extremities of the cylinder members and the said clamp, the hub and connecting cylinders being adapted to contain air under pressure.

In testimony whereof I have hereunto set my hand this 5th day of July, A. D. 1910.

JOSEPH A. GRAY.

In presence of—
J. A. GRAY, Jr.,
C. LOUIS GRAY.